United States Patent [19]

Ichikawa et al.

[11] Patent Number: 4,644,797
[45] Date of Patent: Feb. 24, 1987

[54] SEMICONDUCTOR PRESSURE TRANSDUCER

[75] Inventors: Norio Ichikawa, Mito; Seijiro Takeda, Toukai; Kazuhiro Tsuruoka, Katsuta, all of Japan

[73] Assignee: Hitachi, Ltd., Tokyo, Japan

[21] Appl. No.: 753,854

[22] Filed: Jul. 11, 1985

[30] Foreign Application Priority Data

Jul. 11, 1984 [JP] Japan .................. 59-142359

[51] Int. Cl.$^4$ .................. G01L 7/08; G01L 9/08
[52] U.S. Cl. .................. 73/706; 73/727; 73/754; 73/DIG. 4; 338/42
[58] Field of Search .......... 73/DIG. 4, 706, 715–729, 73/754; 338/42

[56] References Cited

U.S. PATENT DOCUMENTS 3,697,919 10/1972 Orth et al. .................. 73/727

Primary Examiner—Donald O. Woodiel
Attorney, Agent, or Firm—Antonelli, Terry & Wands

[57] ABSTRACT

A semiconductor strain-gage is disposed in a recessed chamber of a housing. A step is provided in the recessed chamber. Minute grooves are provided in the inner peripheral portion of the step. An outer periphery of a metal disk with a pressure introducing bore is clamped to the minute grooves by means of plastic deformation thereof, after the seal diaphragm is disposed on a planer portion of the step, whereby the seal diaphragm closes the recessed chamber harmetically.

7 Claims, 2 Drawing Figures

SEMICONDUCTOR PRESSURE TRANSDUCER

FIELD OF THE INVENTION

The present invention relates to a semiconductor pressure transducer. More particularly, the invention pertains to a semiconductor pressure transducer which may be employed to detect oil pressures, such as the transmission oil pressure and the engine oil pressure, in, for example, an automobile, or a high fluid pressure on the order of several hundred atms in, for example, a construction machine.

BACKGROUND OF THE INVENTION

There has been a conventional pressure transducer of the type employing a seal diaphragm and having such a structure that a pressure is transmitted to a diffusion strain-gage chip through a liquid, such as silicon oil.

Such a conventional pressure transducer is known by such as U.S. Pat. No. 3,697,919 issued on Oct. 10, 1972 in the title of "Semiconductor pressure transducer structure". In such a conventional pressure transducer, the strain-gage chip is isolated from an object to be measured and, therefore, the pressure transducer has excellent corrosion resistance. Further, since a pressure is applied from the surface of the gage, a stress acts on the gage bonding portion in the direction in which it is compressed and it is consequently possible for the pressure transducer to bear services under high pressures. In the structure of the type described above, reliability is affected by the manner in which the sealing of silicone oil or another type of oil is effectively maintained. To maintain the sealing of the oil, it is necessary to hermetically bond a seal diaphragm provided for the purpose of closing a recessed chamber in which the strain-gage chip is disposed. To obtain high reliability, a high quality welding technique and a material which produces scarcely any blowholes are required.

Accordingly, it is conventional practice to employ a vacuum melting material, such as SuS 304 or SuS 316, as a metal member in the pressure transducer and to conduct welding in a vacuum by means of electron beam welding, whereby the seal diaphragm made from a rolled material of SuS304 or SuS316 is hermetically bonded.

The above-described structure, however, involves an expensive welding device which has low operability in this application and a limited range of usable materials. For this reason, a pressure transducer having such a structure is disadvantageously high in cost. In addition, since the strain-gage chip is easily affected by heat, reliability is easily lowered.

From this perspective, to mount the pressure transducer on, for example, an automobile, it is necessary to discover a structure which enables the pressure transducer to be mass-produced at a reduced cost and permits high reliability to be maintained. These days in particular, there is an increasing demand for electronic control of oil pressures, and it is necessary to quickly develop a small-sized, highly reliable and low-cost pressure transducer for detecting the oil pressure for electronic controlled transmission and the oil pressure for engine control in an automobile, or for detecting the oil pressure in a hydraulic construction shovel.

SUMMARY OF THE INVENTION

An object of the present invention is to provide a semiconductor pressure transducer which has high reliability.

The present invention, as apparent from the description of the detailed description of the preferred embodiments mentioned later, is characterized in that a seal diaphragm is clamped to a chamber, which encloses a semiconductor strain-gage therein, by means of a plastic deformation at an outer peripheral portion of a metal dish with a pressure introducing bore.

By using a plastic deformation of a metal dish, the present invention is able to avoid a generation of blowhole at the seal diaphragm without using a particular thermal resistance element such as SuS 304 or SuS 316 which is necessary thermal treatment in connecting the seal diaphragm and the housing. According to the present invention, a leakage of an oil, sealed in the space between the seal diaphragm and the chamber which encloses the semiconductor strain-gage, can be prevented, and prevent a contamination of the semiconductor strain-gage caused by the leakage of the oil.

Therefore, the present invention is able to accomplish the object of high reliability.

DETAILED DESCRIPTION OF THE PREFERRED EMBODIMENTS

Figure 1:
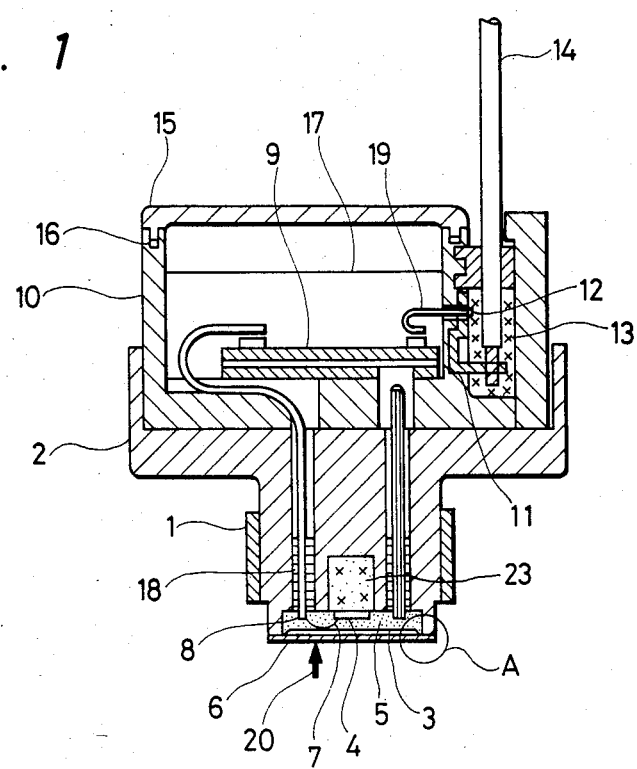
FIG. 1 shows an embodiment of the present invention.

Referring to FIG. 1, a metal member 2 with a threaded portion 1 has a recessed chamber provided at the end of the metal member 2 on the side thereof which is closer to the threaded portion 1, and a strain-gage chip 4 is housed in the center of the recessed chamber in a state wherein the strain-gage chip 4 is bonded to a support 23 made of borosilicate glass. Further, a lead 8 is provided through a hermetic seal 18 between the strain-gage chip 4 and the threaded portion 1 in such a manner that the lead 8 is insulated from the metal member 2. A gold wire 7 is connected between the strain-gage chip 4 and the head portion of the lead 8. On the other hand, a housing 10 is mounted on the other end of the metal member 2. A circuit board unit 9 having such functions as temperature compensation and output amplification is housed inside the housing 10. The lead 8 is connected to the circuit board unit 9.

On the other hand, a seal diaphragm 3 is hermetically bonded to the distal end of the recessed chamber. Silicone oil 5 is vacuum-sealed in the recessed chamber which is closed by the seal diaphragm 3. The seal diaphragm 3 is obtained by forming thin stainless steel SuS 304 having a thickness on the order of 0.05 mm into a corrugated shape. A plate 6 having a pressure introducing bore 20 is provided for the purpose of protecting the seal diaphragm 3.

Figure 2:
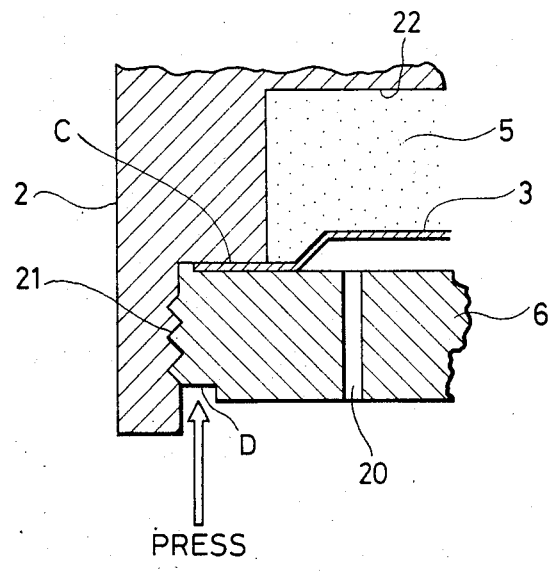
FIG. 2 is an enlarged view of an essential part of the invention shown in FIG. 1.

Referring to FIG. 2 which shows in detail the bonded area between the plate 6 and the metal member 2, a step C is provided in the recessed chamber 22 for housing the strain-gage chip 4. Further, three minute grooves 21 are independently provided on the inner peripheral surface of the metal member 2. In this case, the seal diaphragm 3 is formed by employing a rolled material of SuS 304 with a thickness of 0.05 mm in a manner similar to the conventional one and is disposed on the step planar portion C in such a manner as to close the recessed chamber. Then, the plate 6 having the pressure introducing bore 20 is mounted on the seal diaphragm 3 in such a manner as to clamp the seal diaphragm 3. The outer periphery D of the plate 6 is subjected to a pressing operation with a press width of 0.3 to 0.4 mm, whereby the plate 6 is plastically deformed so as to be connected to the minute grooves 21 provided on the metal member 2. In this case, 0.45% carbon-steel, or AISI 1045, is employed as the material for the metal member 2, while cold rolled carbon steel sheet is employed as the material for the plate 6. In addition, both the member 2 and the plate 6 are plated with nickel for the purpose of improving their corrosion resistance. Moreover, as to the dimensions of the grooves 21, three grooves having a depth of 0.05 to 0.15 mm are independently provided over the entire circumference of the inner wall of the metal member 2 at a pitch of 0.15 to 0.3 mm so that the plate 6 and the metal member 2 are tightly connected together without applying any stress to the strain-gage chip 4. Further, the thickness of the plate 6 correlates with the outer periphery thereof. The thickness of the plate 6 is, therefore, properly set as follows: about 0.5 mm for a plate with an outside diameter of 10 mm or less; about 0.6 mm for an outside diameter of 12 mm; and about 1.0 mm an outside diameter of 20 mm. The pressure used in pressing the plate 6 is controlled such as to be 140 to 180 Kg/mm$^2$ in terms of surface pressure. By so doing, the plate 6 is tightly connected to the grooves 21 with the above-described press width of 0.3 to 0.4 mm, and it is possible to hermetically clamp the seal diaphragm 3 by this bonding power at the bonded area between the plate 6 and the metal member 2.

As will be clear from the above description, according to the present invention it is possible to change the material for the metal member from a conventionally employed vacuum melting material, such as SuS 304 or 316, into an ordinary steel material, for example, 0.45% carbon-steel.

Further, since a hydraulic press suffices as a connecting device, it is possible to mass-produce the semiconductor pressure transducer by the use of a simple jig alone. In addition, since there is no thermal effect on the strain-gage chip, it is possible to encourage reduction in the size of the pressure transducer and to improve its reliability.

What we claim is:

1. A semiconductor pressure transducer having a housing which has a chamber for enclosing a semiconductor strain-gage, a seal diaphragm formed in the manner to hermetically close said chamber, and an oil sealed in the space defined between said seal diaphragm and said chamber, characterized in that said seal diaphragm is hermetically sealed to said chamber at the peripheral portion thereof by means of a plastically deformed material at an outer periphery of a plate with a pressure introduction bore.

2. A semiconductor pressure transducer as defined in claim 1, characterized in that the material of said housing is 0.45% carbon-steel, and the material of said plate is cold rolled carbon steel sheet.

3. A semiconductor pressure transducer as defined in claim 1, characterized in that said semiconductor strain-gage is mounted on said housing through borosilicate glass.

4. A semiconductor pressure transducer as defined in claim 1, characterized in that said housing has a step provided in said chamber, and said plate is clamped to the peripheral portion of said step at the periphery thereof by impression force of 140 to 180 Kg/mm$^2$ sandwitching said diaphragm between the planar surface of said step and said plate.

5. A semiconductor pressure transducer as defined in claim 1, characterized in that said plate is disk-shaped, and said housing has a step provided in said chamber, a plurality of minute grooves are provided in the inner peripheral portion of said step, and said grooves have a pitch of 0.15 to 0.25 mm and a depth of 0.03 to 0.08 mm, respectively, wherein said plate is coupled to said grooves by the plastic deformation thereof.

6. A semiconductor pressure transducer as defined in claim 1, characterized in that a through-hole is formed from the bottom of said chamber to the opposite surface of said housing which opposes to said bottom, and a lead pin for drawing out a signal of said semiconductor strain-gauge is hermetically sealed in said through-hole.

7. A semiconductor pressure transducer as defined in claim 1, characterized in that said chamber comprises a recess chamber which is formed in one surface of said housing.

* * * * *